US011455394B2

United States Patent
Khoruzhenko et al.

(10) Patent No.: US 11,455,394 B2
(45) Date of Patent: Sep. 27, 2022

(54) SECURE FIRMWARE INTERFACE

(71) Applicant: Absolute Software Corporation, Vancouver (CA)

(72) Inventors: Eugene Khoruzhenko, Redmond, WA (US); Philip B Gardner, Woodbury, MN (US)

(73) Assignee: Absolute Software Corporation, Vancouver (CA)

( * ) Notice: Subject to any disclaimer, the term of this patent is extended or adjusted under 35 U.S.C. 154(b) by 357 days.

(21) Appl. No.: 16/641,931

(22) PCT Filed: Sep. 4, 2018

(86) PCT No.: PCT/CA2018/051064
§ 371 (c)(1),
(2) Date: Feb. 25, 2020

(87) PCT Pub. No.: WO2019/046933
PCT Pub. Date: Mar. 14, 2019

(65) Prior Publication Data
US 2020/0257801 A1    Aug. 13, 2020

Related U.S. Application Data

(60) Provisional application No. 62/554,811, filed on Sep. 6, 2017.

(51) Int. Cl.
*G06F 21/57* (2013.01)
*G06F 21/44* (2013.01)
(Continued)

(52) U.S. Cl.
CPC ............ *G06F 21/572* (2013.01); *G06F 21/44* (2013.01); *G06F 21/85* (2013.01); *H04L 9/006* (2013.01);
(Continued)

(58) Field of Classification Search
CPC .................................................... G06F 21/572
See application file for complete search history.

(56) References Cited

U.S. PATENT DOCUMENTS 7,472,208 B2    12/2008  Rothman
8,332,953 B2    12/2012  Lemieux
(Continued)

FOREIGN PATENT DOCUMENTS

NO    WO2015/147879    10/2015

OTHER PUBLICATIONS

V. Manan et al., Windows Secure Boot Key Creation and Management Guidance, May 2, 2017, pp. 1-23, Microsoft.
(Continued)

*Primary Examiner* — Bradley W Holder
(74) *Attorney, Agent, or Firm* — Damien G Loveland

(57) ABSTRACT

A mailbox mechanism is used for communication of secure messages from a server to the firmware of a device. Mailbox content provided by the server is authenticated in a driver execution environment of the device, using reboots across the communication sessions, and then stored in secure storage. The communication sessions include first receiving a signed server key, and then receiving a message from the server that is based on a hash of a nonce generated by the device.

15 Claims, 6 Drawing Sheets

(51) Int. Cl.
  *G06F 21/85* (2013.01)
  *H04L 9/00* (2022.01)
  *H04L 9/08* (2006.01)
  *H04L 9/32* (2006.01)

(52) U.S. Cl.
  CPC .......... *H04L 9/0825* (2013.01); *H04L 9/0869* (2013.01); *H04L 9/3268* (2013.01); *H04L 9/3271* (2013.01)

(56) References Cited

U.S. PATENT DOCUMENTS

| | | |
|---|---|---|
| 8,543,799 B2 | 9/2013 | McCarron |
| 8,607,040 B2 | 12/2013 | Zimmer |
| 8,694,761 B2 | 4/2014 | Zimmer |
| 8,745,383 B2 | 6/2014 | Tarkhanyan |
| 9,384,352 B2 | 7/2016 | Yao |
| 9,489,029 B2 | 11/2016 | Rothman |
| 9,660,807 B2 | 5/2017 | Lewis |
| 2003/0005316 A1 | 1/2003 | Girard |
| 2004/0093597 A1* | 5/2004 | Rao ............... G06F 8/65 717/170 |
| 2005/0021968 A1* | 1/2005 | Zimmer ............ G06F 21/572 713/176 |
| 2005/0044363 A1 | 2/2005 | Zimmer |
| 2009/0327741 A1 | 12/2009 | Zimmer |
| 2012/0290845 A1* | 11/2012 | Bares ............... H04L 9/3247 713/170 |
| 2013/0010957 A1* | 1/2013 | Yu ................ H04L 9/0844 380/260 |
| 2014/0189336 A1 | 7/2014 | Ballesteros |
| 2015/0089209 A1 | 3/2015 | Jacobs |
| 2015/0089238 A1 | 3/2015 | Lewis |
| 2015/0121497 A1* | 4/2015 | Brassard ............ G06F 21/575 726/7 |
| 2015/0379306 A1 | 12/2015 | Zimmer |
| 2017/0220802 A1 | 8/2017 | Huang |

OTHER PUBLICATIONS

A Jumelet et al., Control the health of Windows 10-based devices, Apr. 5, 2017, pp. 1-33, Microsoft.

J Yao et al., A Tour Beyond BIOS Implementing UEFI Authenticated Variables in SMM with EDKII, Sep. 2014, pp. 1-28, Intel Corporation.

M Foley, What's new in vSphere 6.5: Security, Oct. 18, 2016, downloaded from https://blogs.vmware.com/vsphere/2016/10/whats-new-in-vsphere-6-5-security.html on Oct. 25, 2017.

Intel, Intel® Platform Innovation Framework for EFI Capsule Specification, Sep. 16, 2003, pp. 1-31, Intel Corporation.

V Zimmer et al., Establishing the Root of Trust, Aug. 2016, pp. 1-5, The UEFI Forum, Inc.

* cited by examiner

SECURE FIRMWARE INTERFACE

TECHNICAL FIELD

The present invention relates to a communication interface for the firmware of electronic devices. In particular, it relates to the use of a mailbox mechanism, with mailbox content authenticated in a Driver Execution Environment (DXE).

BACKGROUND

It is very important to manage electronic devices remotely, and there is currently no way to remotely manage firmware, because there is no secure way to communicate with it.

SUMMARY

This application describes one way to communicate securely with the firmware to activate and deactivate OEM (original equipment manufacturer) and third party features, and to be able to delegate such activity to the administrator of an enterprise customer. Absolute Software is a third party that deploys its persistence module to most of the personal computer OEMs in the market, and the secure firmware interface disclosed herein is used to activate and deactivate Absolute® Persistence®. The interface is extensible so that it can register other parties in the ecosystem.

A mailbox mechanism is used for communication, with mailbox content authenticated in the DXE phase, and reboots across the communication sessions. The mechanism permits the secure exchange of information between a server and the BIOS of a device. It requires a secure communication channel and secure storage. UEFI variable based mailboxes are used for communication and separate UEFI variables are used as secure storage.

Disclosed herein is a device configured to: receive, from a server, a signed server key; verify the signed server key in a DXE environment of the device firmware; send a nonce to the server, the nonce being encrypted by the signed server key; receive a message from the server that includes a first portion with a secure command and second portion that is based on a hash of the nonce; verify the message in the DXE environment of the device firmware; and execute the secure command.

Also disclosed herein is a method for securely sending a command to a device comprising the steps of: receiving, from a server, a signed server key; verifying the signed server key in a DXE environment of the device firmware; sending a nonce to the server, the nonce being encrypted by the signed server key; receiving a message from the server that includes a first portion with a secure command and second portion that is based on a hash of the nonce; verifying the message in the DXE environment of the device firmware; and executing the command.

DESCRIPTION

A. Glossary

ABT: Absolute® (Absolute® Software Corporation)
API: Application Programming Interface
BIOS: Basic Input/Output System. This is firmware used for hardware initialization during the booting process of an electronic device, and for providing runtime services for operating systems and programs.
BS: Boot service
DXE: Driver Execution Environment. This is the third phase of the UEFI boot process. During the DXE, drivers install boot services and runtime services. In the DXE, the UEFI loads drivers for configured devices, mounts drives, and finds and executes the boot code. After control is transferred to the boot OS, runtime services stay resident to handle OS to UEFI calls and boot services are terminated.
DXE-modifiable-only variables: These are non-volatile Boot Services only variables locked with EDKII_VARIABLE_LOCK_PROTOCOL at the end of the DXE phase. These variables are only modifiable during the DXE phase and are not visible at runtime. In contrast, standard non-volatile boot services UEFI Variables are writable before ExitBootServices( ) and can be tampered with from the UEFI Shell and OPROMs.
NV: Non-volatile
OS: Operating System
ODM: Original Design Manufacturer
OEM: Original Equipment Manufacturer
OPROM: Option read-only memory added to the existing ROM (read-only memory) of a device.
NVRAM: non-volatile random access memory
RSA: type of public-key encryption
RT: Runtime
SAK: Server Authorization Key
SMM: System Management ModeUEFI—Unified Extensible Firmware Interface, a specification that defines a software interface between an operating system and platform firmware. The UEFI is stored as firmware in non-volatile memory.

B. Overview

Figure 1:
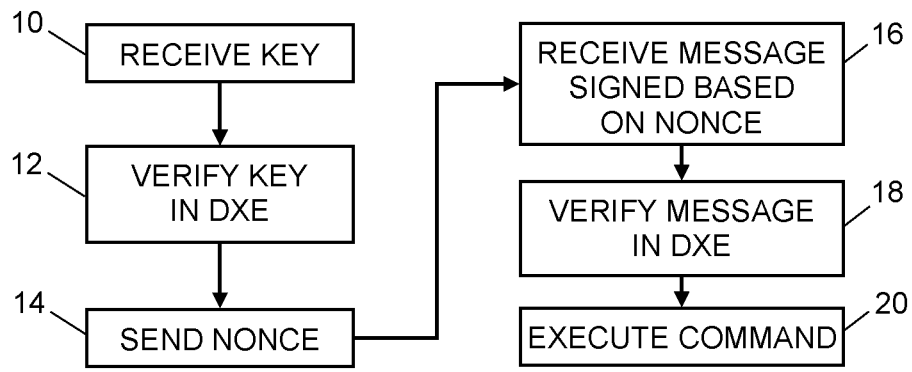
FIG. 1 is a flowchart summarizing the main steps of a method for sending a secure message from a server to firmware of a device, according to an embodiment of the present invention.

Referring to FIG. 1, a method for securely sending a message from a server to device firmware is shown. In step 10 an electronic device, to which a secure message is to be delivered, receives, from the server, the public portion of an authorization key signed with a platform key. In step 12, the device verifies the authenticity of the authorization key in a DXE phase of a boot process of the device. The authenticity of the key is verified with the public portion of the platform key embedded in the device firmware. If the authorization key is valid, it is temporarily stored in non-volatile storage.

In step 14, the device generates and sends a nonce encrypted with the public authorization key back to the server. The server decrypts the nonce with the private portion of the authorization key and retrieves the nonce, which is to be used in the message and verified by the device. In step 16, the device receives the message that has been signed by the server authorization key. The message includes a digest of the device-generated nonce, to be verified by the device. In step 18, the message signing is verified in the DXE phase of a boot process of the device, using the public portion of the authorization key that has been temporarily stored in the device. If the device succeeds in verifying the message, then the content of the message is used by the device to execute a command or store data in a device's secure storage, in step 20. A command may be, for example, to activate or deactivate a component of the firmware.

Figure 2:
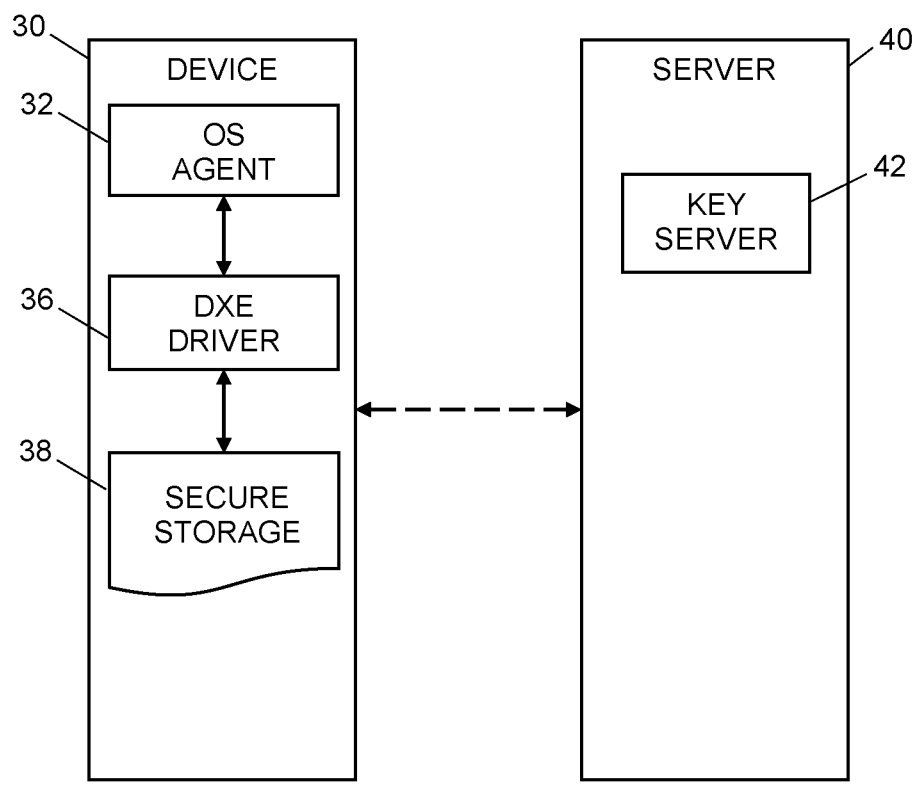
FIG. 2 is an overview of a system for sending a secure message, according to an embodiment of the present invention.

FIG. 2, shows the main modules of a system in which the above method is implemented. The system includes an electronic device 30 (or client), which includes an OS agent 32, a DXE driver 36, and secure storage 38. The DXE driver 36 may also be referred to as a security module. The OS agent 32 is an OS application that communicates securely with the server 40 over the internet or other network. The OS agent 32 communicates with DXE driver 36 by setting one or more UEFI variables that are used as mailboxes. As a result, the DXE driver 36 can either execute a command or store data in secure storage 38.

The OS agent 32 is, or has equivalent functionality to, the Computrace™ agent that is produced by Absolute Software Corporation. Computrace™ deploys a stealthy software client that automatically contacts a monitoring center on a regular basis, transmitting location information and automatically discovered asset data points. Ongoing communication between the OS agent and the monitoring center requires no user intervention and is maintained via the internet.

The server 40 incorporates, or is connected to, a key server 42, which generates and stores the cryptographic keys that are used in the secure communications of the present invention. Secure messages sent to firmware are passed from the server 40, through the OS Agent 32 to the DXE driver 36 by calling, for example, the GET/SET Variable Win32 API. The DXE driver 36 then validates the secure messages and stores information in the secure storage 38.

C. Exemplary System

Figure 3:
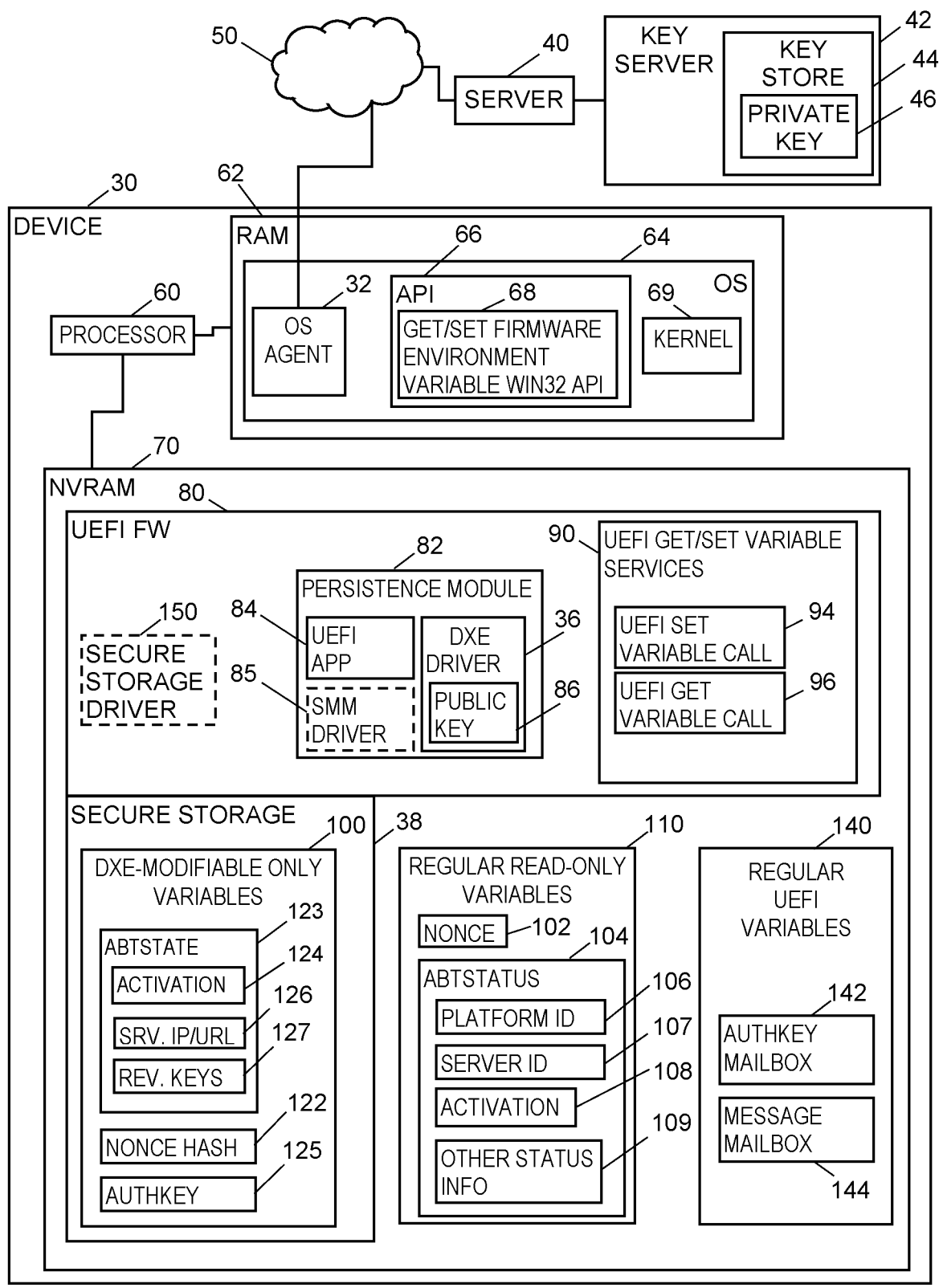
FIG. 3 is a detailed block diagram of a system for sending a secure message, according to an embodiment of the present invention.

Referring to FIG. 3, a block diagram of the modules of an exemplary system for sending secure messages is shown. The server 40 is shown here connected to a separate key server 42, which includes a key store 44 and authorization private key 46 of the server 40. The SAK (server authorization key) is the public portion of the key 46. The key server 42 generates and keeps the SAK. The key server 42 does not provide direct access to its key store 44, but only provides an API allowing clients to "use" the keys from key store (to encrypt/decrypt, sign/verify, etc.), but not to read/write the keys directly.

The server 40 is connected via the internet 50 to the device 30, which includes a processor 60 connected to RAM 62 and NVRAM 70.

The RAM 62 stores the OS agent 32 and the OS 64. The OS 64 includes an API 66, of which a subset is the Get/Set Firmware Environment Variable WIN32 API 68. The kernel 69 of the OS 64 is also shown.

Resident in the NVRAM 70 are the secure storage 38 and the UEFI firmware (FW) 80.

The UEFI firmware 80 includes a persistence module 82, which ensures the presence of the OS agent 32 in the device 30. If the OS agent 32 is ever deleted or corrupted, the persistence module 82 repairs it, replaces it, or retrieves a clean copy of it from server 40 or another server that is dedicated to maintaining the OS agent 32 in the device 30. The OS agent 32 is embodied as a persistent, partial agent and a full agent, and the persistent agent is always replaced on boot with a copy securely stored in device firmware. The persistent agent then downloads the full agent from the server if necessary. The persistence module 82 includes the UEFI application 84, the optional SMM driver 85 and the DXE driver 36. The DXE driver 36 is configured to store a copy of the platform public key 86. The platform public key 86 is built into the DXE driver 36 during manufacture. The SMM driver 85 is optional, and may be used in embodiments based on Windows® 7.

Another separate key server is a signing server, which generates and keeps the platform keys, and is used to sign the SAK, the public portion of key 46. The signing server is not connected to anything for security reasons.

The UEFI firmware 80 also includes the UEFI Runtime Get/Set Variable Services 90 and its various modules, which include a UEFI Set Variable Call 94 and a UEFI Get Variable Call 96. UEFI Runtime Get/Set Variable Services 90 are part of the UEFI core code, designed to securely write data to the NVRAM 70. This is secure so long as the UEFI Get/Set Variable Services 90 are called from within the DXE phase.

Stored in the secure storage 38 are the DXE-modifiable-only variables 100. The variables in secure storage 38 are accessed directly by the DXE driver 36 in a standard way.

DXE-modifiable-only variables 100 are those that can only be modified during the DXE phase of a boot process. DXE-modifiable-only variables 100 include a state variable (ABTSTATE) 123, which includes the Activation field 124, the Server IP/URL field 126 and the Revocation Keys field 127. DXE-modifiable-only variables 100 also include the NonceHash 122 and the AuthKey 125.

Regular read-only variables 110 include a nonce 102 and a status variable (ABTSTATUS) 104. The status variable 104 is a single variable with separate fields, which include Platform ID 106, which is an ID of the device 30; the Server ID 107, which is the ID of the server 40; Activation field 108; and other status information 109.

The regular UEFI variables 140 include the AuthKey Mailbox 142 and the Message Mailbox 144.

Optionally, a secure storage driver 150 is included in the UEFI FW 80. In this case, the DXE driver 36 validates secure messages and stores information in the secure storage 38 by calling the secure storage driver 150. The secure storage driver 150 is optional, and only necessary if the secure storage is not implemented as standard UEFI variables.

D. Exemplary Processes

Figure 4:
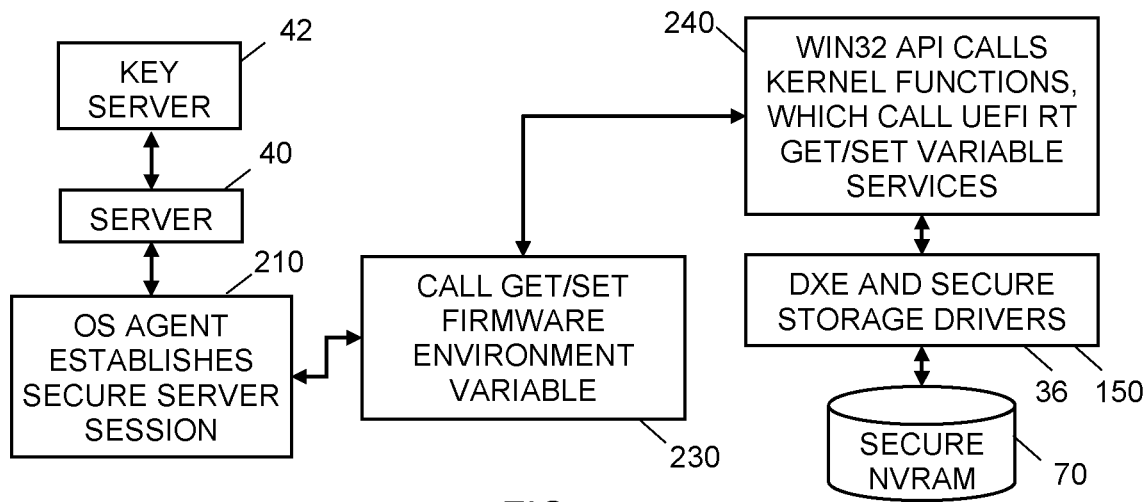
FIG. 4 is a flowchart showing the runtime services data flow, according to an embodiment of the present invention.

Looking at FIG. 4, and making reference to FIG. 3, a flowchart shows the runtime services data flow between the device 30, server 40 and UEFI FW 80. In step 210, the OS agent 32 establishes a secure connection with the server 40 as it is the OS agent that initiates the call. The server 40 is shown connected to the key server 42. Although the calls are issued by the OS agent 32, the server 40 is in an active role and drives the communication protocol. In step 230, the server 40 causes the OS agent 32 to communicate with the UEFI firmware 80 by calling the Get/Set FirmwareEnvironmentVariable Win32 API 68. In step 240, the Win32 API calls go through the OS kernel 69 to eventually call the UEFI Runtime Get/Set Variable Services 90. The DXE driver 36 validates the information written to the message mailbox 144 and responds by setting the status variable 104, thus communicating via the UEFI variable service 90. Secure messages that are signed and sent by the server are received and verified by the DXE driver 36 and the information in the messages is securely stored in the secure storage 38 of the NVRAM 70. RSA 2048 is used for encryption, decryption, and signing operations.

Figure 5:
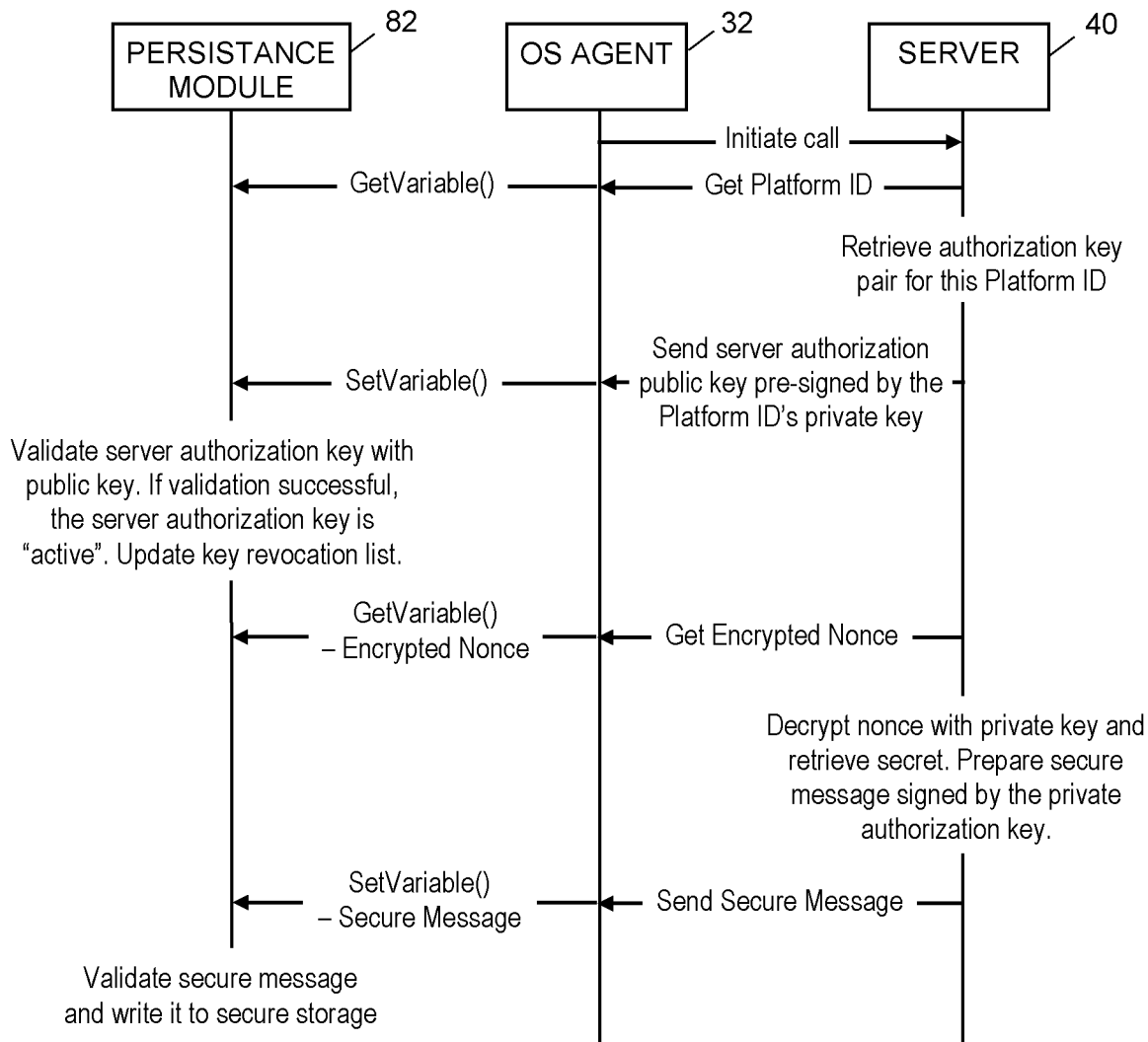
FIG. 5 is a sequence diagram showing the secure communication flow, according to an embodiment of the present invention.

FIG. 5 shows the secure communication flow between the persistence module 82, the OS agent 32 and the server 40. After the OS agent 32 has initiated the call to the server 40, the server reads the Platform ID 106 from the device 30 via the OS agent to retrieve the authorization key pair for this Platform ID from the key store 44. The server 40 then sends the authorization public key, pre-signed, to the OS agent 32. The authorization public key is signed by Absolute Software Corporation's private key or another appropriate authority's private key, provided it is the same authority whose public key is in the persistence module 82. The OS agent 32 passes the pre-signed authorization public key to the persistence module 82 via a UEFI SetVariable call 94. The persistence module 82 validates the server authorization key using a copy of the platform public key, and if the validation is successful, the server authorization key is stored in the secure storage 38 for future use. The persistence module 82 then updates the key revocation list and all the other information that is delivered in the authorization key payload (also called an authorization blob). The other information includes, for example, creation time, expiration time, server ID, server IP, server URL, etc. The AuthBlob is like a certificate, which has the creation/expiration dates, and list of revoked keys.

The server 40 then requests a nonce 102, which is encrypted by the DXE driver 36 in the persistence module 82 using the server authorization key previously validated and stored as described above. The OS agent 32 reads the encrypted nonce via a UEFI GetVariable call 96 and sends it to the server 40. The server 40 decrypts the nonce using the server's private authorization key, and then prepares a secure message that is signed by the server's private authorization key and includes the digest of the nonce. The server 40 then sends the secure message to the persistence module. On receipt of the secure message, the persistence module 82 validates the message signature, verifies the nonce, and executes the command that was delivered in the secure message. The command is, for example, to launch an application, save some data, delete some data, collect some data and send to server, etc.

Figure 6:
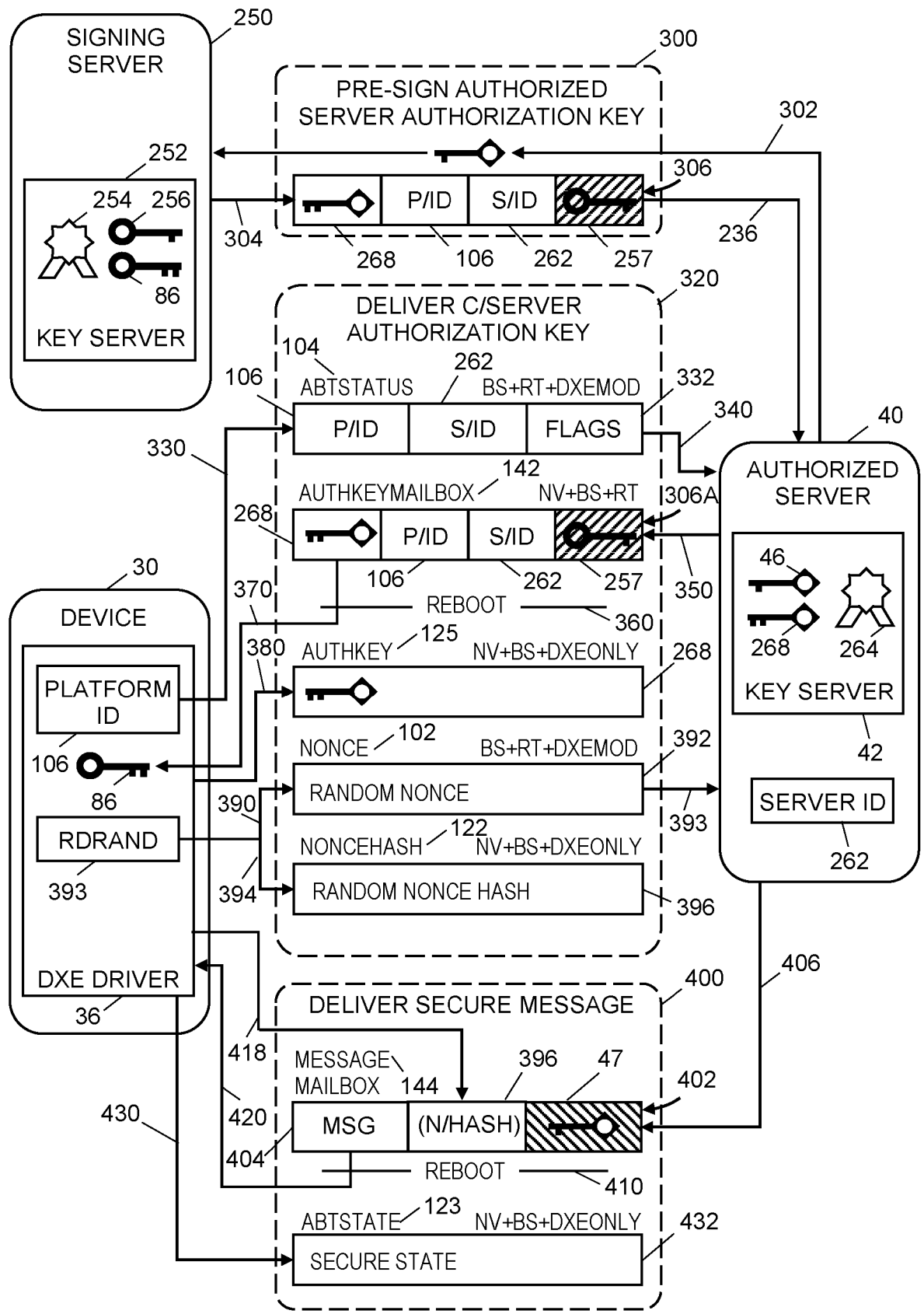
FIG. 6 is a diagram showing the flow of secure messages, according to an embodiment of the present invention.

FIG. 6 shows an exemplary configuration of servers for the flow of secure messages to the firmware of a device 30. Each type (i.e. make and model) of device 30 has a corresponding platform ID 106. In this embodiment, a signing server 250 includes a key server 252 for platform keys, which has an authentication certificate (or root certificate) 254 for a platform private key 256 and a corresponding platform public key 86. In practice, there are multiple platform key pairs stored in the signing server 250, one pair for each different platform. A platform represents a specific device make/model or whole OEM product line. For clarity, FIG. 6 is presented for one platform, identified by its platform ID and corresponding platform key.

The signing server 250 is not connected to the internet and is offline most of the time. It is only used when needed to sign a new authorization server public key, i.e. to create an AuthBlob. The implementation of the key server 252 can be, for example, a Hardware Security Module (HSM). An authorized server 40 with server ID 262 includes or is connected to a key server 42 for authorized keys, storing an authentication certificate 264 for a private key 46 and a public key 268. The key server 42 could be an HSM or it could be as simple as an OS certificate store. The authorized server 40 and the signing server 250 are not connected to each other, although information can be passed securely between the two.

For each type of device 30 that the authorized server 40 manages, there is a corresponding key pair 46, 268 and authentication certificate 264. Although it is called an authentication certificate 264, it also provides authorization, in that the signing of the public key 268 by the signing server shows that the key is authorized to do things listed in the certificate (AuthBlob). While only one authorized server 40 is shown here, in some embodiments there are multiple authorized (or partner or customer) servers 40, each responsible for managing the corresponding customer's devices 30.

Box 300 describes the pre-signing of the authorized server's 40 public key 268 for a particular platform ID 106. At step 302 the authorized server 40 requests signing of its public key 268 with the signing server's 250 private key 256. It sends a copy of its public key 268 to the signing server 250, in response to which the key server 252 signs the authorized server public key 268 with the signing server private key 256. The signing server 250 therefore authorizes a customer/partner server 40 by pre-signing its public key 268.

In step 304, the signing server 250 delivers the pre-signed authorization key blob 306 to the authorized server 40 as, for example, part of a service agreement between the operator of the signing server 250 and its customer/partner. The pre-signed authorization key blob includes the signed authorized server public key 268, the platform ID 106 to which it relates, the authorized server ID 262, and other information about the authorized server as described above. The hatched key area 257 indicates the signature of the authorization key blob 306 by private key 256.

Box 320 shows delivery of the authorized server authorization key 268 to the device 30. In step 330, on every boot, the DXE driver 36 populates the AbtStatus read-only (BS+RT) variable 104 (FIG. 3) with the device's platform ID 106, the server ID 262 and one or more flags 332. The AbtStatus variable 104 is a read-only variable accessible at runtime. The OS agent 32 then transmits the contents of the AbtStatus variable 104 to the authorized server 40, in step 340.

The authorized server 40 then uses the platform ID 106 field of the AbtStatus variable 104 to select the corresponding authorization key pair 46, 268 for the platform ID. In step 350, the authorized server writes the selected authorization key blob 306A to the AuthKeyMailbox UEFI variable 142 via the OS agent 32 running on the device 30. The AuthKeyMailbox variable 142 is stored in non-volatile memory, is a regular variable (BS+NV+RT) and is accessible at runtime. The authorization key blob 306A includes the authorized server signed public key 268, the platform ID 106, the server ID 262, and other information about the authorized server. The hatched key 257 indicates the signature of the authorization key blob 306A by private key 256.

After the AuthKeyMailbox variable 142 is set, a reboot 360 is required for the DXE driver 36 to securely verify the mailbox content (i.e. the values of the AuthKeyMailbox variable 142) in the DXE phase of the next boot. The reboot 360 is triggered by the authorized server 40 via the OS agent 32.

In step 370, during reboot 360, the authorization key blob 306A is verified using the signing server public key (i.e. platform key) 86 embedded in the DXE driver 36. The signing server public key 86 is embedded in the DXE driver 36 included in system firmware at the time of manufacture of the device 30. If the verification is successful, then the DXE-modifiable-only UEFI variable AuthKey is set by the DXE driver with a value of Authorization Key, i.e. the value is the pre-signed authorized server public key 268. The AuthKey variable is in non-volatile memory and is a boot service variable.

On every boot the DXE driver 36 generates, in step 390, the Nonce read-only variable 102, which contains a large random number, i.e. random nonce 392. The nonce 392 is generated by a random number generator 393. The Nonce variable 102 is a read-only variable accessible at runtime. A hash 396 of the random nonce 392 is saved, in step 394, in the NonceHash DXE-modifiable-only UEFI variable 122 for later comparison. The NonceHash variable 122 is DXE-modifiable-only variable, not visible at runtime. In step 393, the authorized server 40 reads the nonce 392 to include it, or a value derived from it, in the subsequent secure message, preventing replay attacks.

Box 400 relates to the delivery of a secure message from the authorized server 40 to the device 30. The authorized server 40 constructs a secure message 402 that includes the secure command and other data 404, and the nonce hash 396 (or a derivation of it). The hatched key 47 indicates the signature of the secure message 402 by private key 46. The secure message 402 is written by the OS agent 32 to the MessageMailbox variable 144 in step 406.

If the nonce hash 396 is not included in the secure message, the server 40 creates the secure message without the nonce hash, but includes the nonce hash when creating a signature, as if the nonce hash were a part of the secure message. On the device side, the incoming message is extended with the nonce hash 396 saved on the device for signature verification, in step 394. As a result, the signature will only be verified if the nonce hash added to the secure message by the device is the same as the nonce hash used by the server to create the signature for the secure message. A particular benefit of using a value derived from the nonce hash is that the nonce hash does not need to be transmitted between the server and the device.

A second reboot 410 is then required for the DXE driver 36 to securely verify the content 402 of the MessageMailbox variable 144 in the DXE phase during the reboot. The second reboot 410 is triggered by the OS agent 32. In step 420, the signature of the secure message 402 is verified, by the DXE driver, with the signed authorized server public key 268 previously stored in the AuthKey variable 125. The DXE driver also compares the nonce hash 396 (or derivation of it) received from the authorized server 40 with the value previously saved in the NonceHash variable 122.

If all the checks verify correctly, then the DXE driver 36 parses the now-trusted secure message 404 and, in step 430, updates the value of the state 432 in the AbtState DXE-modifiable-only variable 123. The AbtState variable is in non-volatile memory and is a Boot Services variable, NV+BS, and locked at the end of the DXE phase.

Figure 7:
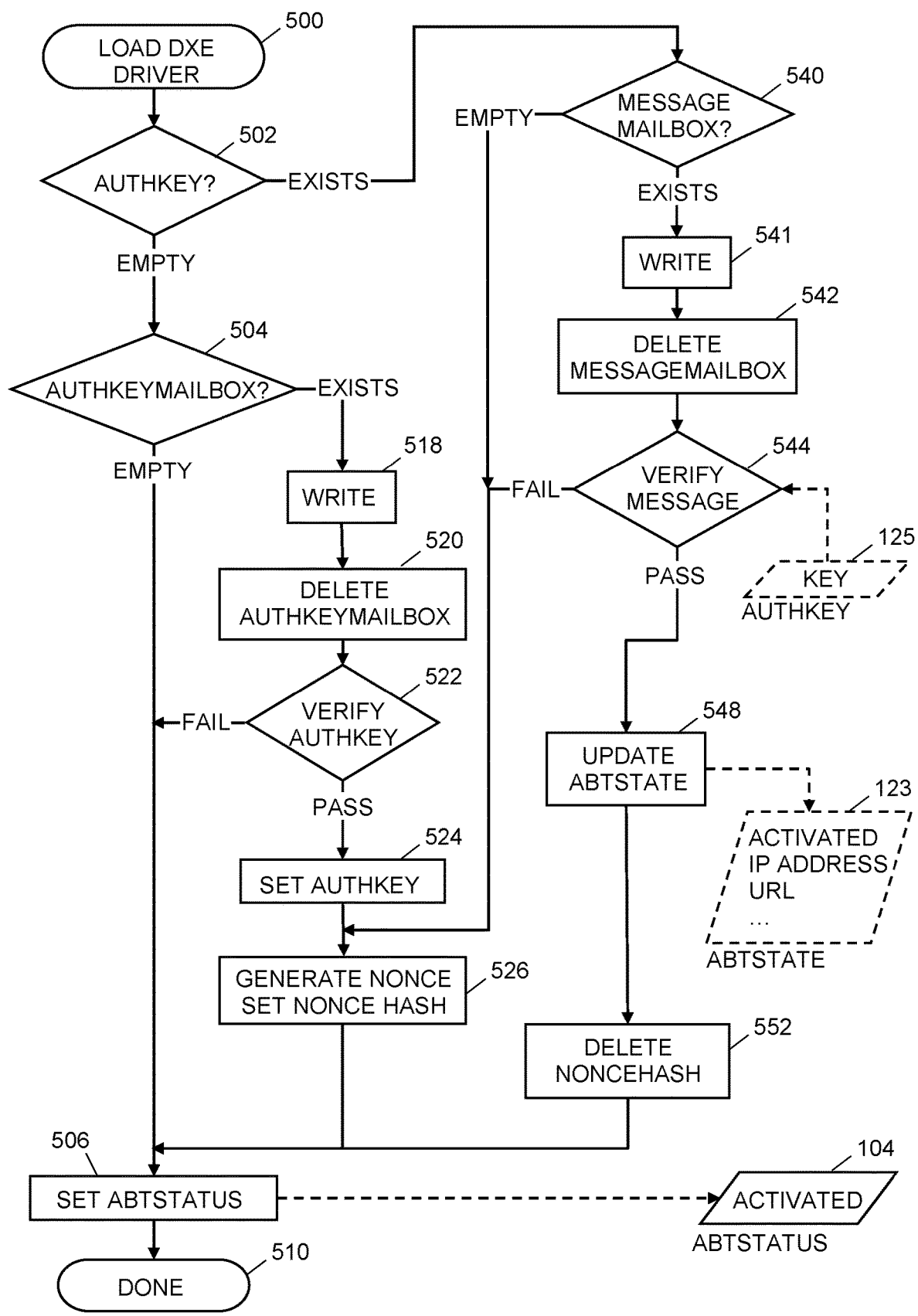
FIG. 7 is a flowchart showing operation of the DXE driver, according to an embodiment of the present invention.

FIG. 7 shows operation of the DXE driver 36. During normal boot, the DXE driver 36 is loaded on every boot, in step 500, provided that the persistence module 82 is enabled in the device. The persistence module 82 can be enabled or disabled depending on an option setting in the BIOS. In other embodiments, the persistence module, or at least a necessary portion of it, is always enabled. In step 502, the DXE driver 36 checks whether a value for the AuthKey variable 125 was provisioned in the previous boot. If a value for the AuthKey variable 125 was not provisioned, then the DXE driver 36 checks the AuthKeyMailbox 142 in step 504. If the AuthKeyMailbox 142 is empty, which it is during normal operation, the DXE driver 36 sets the AbtStatus variable 104, in step 506, and then exits in step 510.

Upon exiting, at the end of every boot, the DXE driver 36 sets the AbtStatus variable 104 in step 506 by populating the Platform ID field 106, the Server ID field 107, and the status information field 109 for the OS agent 32 and server 40 to read. If the persistence module 82 is not activated in the device 30, the AbtStatus fields are set to initial values.

In the authorization key provisioning phase, if AuthKey is empty, in step 502, the DXE driver checks if AuthKeyMailbox was set by the server 40 via the OS agent 32 on the previous boot. If the AuthKeyMailbox variable is not empty, i.e. a variable exists in it, then the DXE driver 36 reads its contents and writes 518 the contents to memory, and then deletes the AuthKeyMailbox variable in step 520.

Next, in step 522, the DXE driver 36 verifies the AuthKey blob 306A with the signing server public key 86 embedded in the DXE driver, and also checks the Platform ID 106. If the persistence module 82 was already activated, then the DXE driver checks the previously saved Server ID and rejects an AuthKey from any other server.

If the verification step 522 is passed, the DXE driver 36 sets the AuthKey DXE-modifiable-only variable 125 with the value of the authorization key (i.e. the signed authorized server public key 268) in step 524. If the verification step 522 is failed, then the DXE driver 36 proceeds to exit via step 506.

In step 526, the DXE driver 36 generates the Nonce read-only variable 102, which contains a large random number 392 for the authorized server 40 to include in the secure message 402, or to include a value derived from it and include the derived value in the secure message. Next, the DXE driver 36 saves the nonce's hash 394 to the NonceHash DXE-modifiable-only variable 122. The DXE driver 36 then sets AbtStatus 104 to indicate that AuthKey was successfully provisioned and the device 30 is ready to receive a secure message 402 on the next boot. Booting then continues.

In the secure message phase, if AuthKey was set on the previous boot, the DXE driver 36 checks, in step 540, whether there is a secure message 402 in the MessageMailbox 144. If the MessageMailbox is empty, then the DXE driver 36 generates a new nonce in step 526 and keeps attempts to get the secure message on subsequent boots. If, in step 540, the MessageMailbox variable 144 is not empty, i.e. a value for it exists, then the DXE driver 36 reads its contents and writes the contents to memory in step 541, and then deletes the MessageMailbox variable in step 542.

In step 544, the DXE driver 36 verifies the received secure message signing using the authorization key 268 previously stored in the AuthKey variable 125. In one embodiment, the DXE driver 36 validates the nonce hash 396 received from the authorized server 40 by comparing it with the previously saved value in the NonceHash variable 122. In another embodiment, the incoming message is extended with the nonce hash 396 previously saved on the device. As a result, the signature will only be verified if the nonce hash added to the secure message by the device is the same as the nonce hash used by the server to create the signature for the secure message. If verification in step 544 fails, the DXE driver 36 generates a new nonce in step 526 and booting continues, ready to receive a valid secure message 402 on the next boot. If the verification of step 544 is successful, then in step 548 the DXE driver 36 updates the AbtState variable 123 with data from secure message 402. If the secure message was to activate the persistence module 82, then the DXE driver 36 saves the SrvId field 262 of the Server ID variable 107, so that further secure messages are only accepted from this server.

Following this, the DXE driver 36 cleans up by deleting the NonceHash variable in step 522, and then proceeds to update the state of the device in step 506. In step 506, the DXE driver 36 sets AbtStatus to indicate that the secure message 402 was successfully processed and the device 30 is ready for the next secure message, if any.

Figure 8:
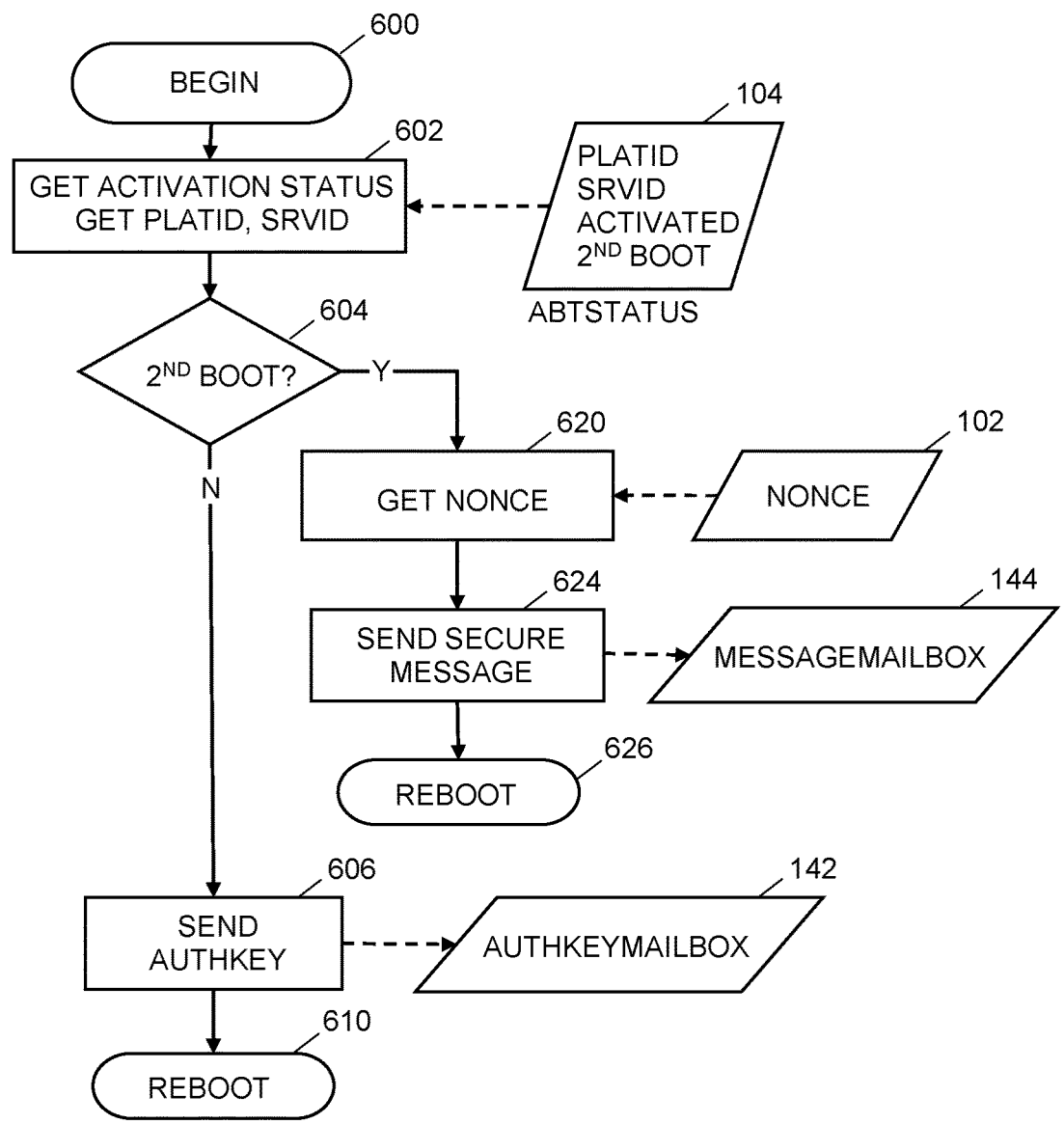
FIG. 8 is a flowchart showing activation and deactivation flow, according to an embodiment of the present invention.

FIG. 8 shows an activation and deactivation process that begins with step 600, which is initiated by a utility that installs the OS agent 32 and establishes communication with the authorized server 40. The installation utility installs the OS agent 32, which immediately contacts the authorized server 40, which in turn controls the device 30 per the flow described above. In accordance with the secure communication flow described with respect to FIG. 5, the new activation/deactivation steps are as follows:

In step 602, the server 40 reads the PlatId 106, SrvId 107, Activation 108 and other status information 109 from the AbtStatus read-only variable 104 populated by the DXE driver 36.

For the purposes of the flowchart, the "first boot" is when the AuthKey is provisioned, and the "second boot" is when the AuthKey is successfully provisioned and the secure message is sent. In the first communication phase, i.e. if in step 604 the boot number is not the second boot (so it must be the first boot), the first task is to provision the server authorization key. In step 606, the server sends the signed authorization key blob 306A to the device 30, which is written to the AuthKeyMailbox UEFI variable 142. A reboot occurs in step 610, and is required for the DXE driver 36 to verify the blob, extract the authorization key, and save it in the AuthKey DXE-modifiable-only UEFI variable 125.

After the reboot, the OS agent 32 takes control and communicates with the server 40 again, the process restarting from step 600. In step 602, the server checks that the $2^{nd}$ Boot status is set, which means that the AuthKey was accepted by the BIOS and the device 30 now expects the secure message. Since the $2^{nd}$ Boot status is set, the test in step 604 is affirmative and leads to step 620, in which the server 40 reads the nonce read-only variable 102 created by the DXE driver 36 on the second boot.

In step 624, the server uses the nonce 392 to construct the secure message 402 to activate/deactivate the persistence module 82. The server then sends the secure message 402 to the device 30. The OS agent 32 saves the secure message 402 to the MessageMailbox UEFI variable 144. The device is then rebooted in step 626.

After the second reboot, the DXE driver 36 validates the secure message 402 and changes the Activation flag 124 in the AbtState DXE-modifiable-only variable 123. If the secure message 402 also included other data besides the Activation flag 124, for example IP/URL override information for the OS Agent to call a different server, then the IP/URL override information is saved by the BIOS in the "SRV IP/URL" field 126 in AbtState variable 123 and used by the OS agent 32 on the next boot.

It is possible that a number of AuthKey blobs are sent in a row; each subsequent AuthKey blob received resets the state machine.

The secure firmware interface of the present system is advantageous in that, depending on the particular embodiment implemented, it includes one or more of the following benefits: Various firmware settings such as anti-theft and data protection settings can be updated remotely and this process is highly secure, at a level required for firmware security. Settings can be securely updated remotely by an authorized server (i.e. customer/partner server) via the OS agent. Settings are updatable only by the authorized server. Different servers can be authorized to securely update the device's firmware settings. Security can be improved by supporting separate keys for each OEM/ODM based on Platform ID. Standard OS functions can be used to read/write UEFI variables without requiring a special driver. Secure storage persists after a factory reset or flash update. No modification is required to the device manufacturing process. The process is at least as secure as standard implementations of UEFI authenticated variables. Verification and storage processes are isolated from the RT environment. Secure storage 38 is locked down at or before the EndOfDxe event to prevent tampering.

E. Variations

The owner or operator of the signing server 250 can revoke the specific authorized keys causing the authorized server to update its endpoint devices 30.

The revocation list "Rev. Keys" 127 (FIG. 3) stores IDs of the keys that are marked as revoked. Only authorization keys can be revoked. In case an authorized server 40 is compromised, its key ID (hash of the public key modulus) is added to the signing server 250 database. The authorized server 40 is then required to generate a new key pair (46, 268) and submit the public portion 268 to the signing authority 250 for signage. The signing server 250 generates a new signed AuthBlob 306 (i.e. "certificate") for the new public key 268 and includes the revoked key ID in the revoked keys list of the AuthBlob. The newly generated AuthBlob containing the list of the compromised key IDs is issued back to the authorized server 40 in step 236 (FIG. 6). When the new AuthBlob 306A is provisioned to the device 30 in step 350, and after it is verified by the device after reboot 360, the revocation list from the AuthBlob is saved in the "Rev. Keys" field 127 of the AbtState variable 123. The AuthBlob verification step 522 (FIG. 7) includes checks of whether the AuthBlob is not expired and that its key ID is not in the revoked keys list. Thus, if a rogue server tries to communicate with device 30 using the compromised authorization key, its request will be rejected as the compromised key will be found in the revoked keys list.

The authorized server 40, whose authorization key was compromised, must proactively communicate with all its managed devices 30 to provision the new AuthBlob with the revoked keys list now including the compromised key. This process must be performed as soon as possible and ideally before a rogue server has a chance to communicate with devices using the compromised key while the devices' revoked keys lists are yet to be updated.

Other encryption conventions may be used instead of RSA 2048.

Figure 9:
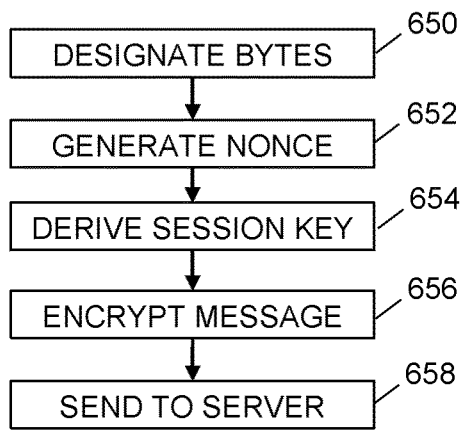
FIG. 9 is a flowchart of steps carried out by a device to derive a session key, according to an embodiment of the present invention.
Figure 10:
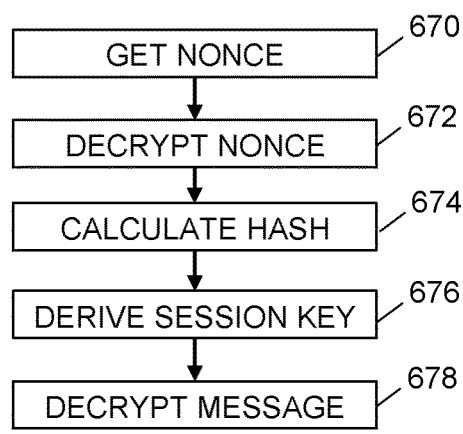
FIG. 10 is a flowchart of steps carried out by a server to derive the session key, according to an embodiment of the present invention.

A further variation is shown in FIGS. 9-10. As the nonce is an array of random 256 bytes (for an RSA-2048 key size), certain bytes are designated as being a symmetric session key. The device uses this session key to encrypt further messages going out to the server via UEFI read-only variables. These further messages are different from the secure messages described above in that they go from the device to the server. The server decrypts the nonce anyway to calculate the nonce hash as part of the main protocol, and it also uses the nonce bytes designated as the symmetric key to decrypt further messages from the device. This method provides an elegant way to communicate back securely to the server without any extra reboots or other extra steps.

Referring to FIG. 9, which represents the steps performed by the device, in step 650 certain of the bytes are designated as a symmetric session key. In step 652, the nonce is generated. In step 654, the session key is derived from the generated nonce. In step 656, a further message is encrypted by the session key, and in step 658, the device sends the encrypted further message to the server.

The server carries out the steps as shown in FIG. 10. In step 670, the server gets the nonce from the device, the nonce being encrypted with the authorized server's Auth-Key, which is an RSA public key. In step 672, the authorized server decrypts the nonce with the private portion of the AuthKey, stored in its key server. In step 674, the server calculates the hash of the nonce, using the same algorithm that the device uses to calculate the hash of the nonce. In step 676, the server derives the session key from the designated bytes of the nonce, In step 678, the server then decrypts the further message from the device.

The secure storage 38 does not have to be boot services DXE-modifiable-only variables. Other secure storage, besides the use of UEFI variables, are used at the firmware level in other embodiments, e.g. a separate memory chip or crypto controller.

Reboots can be eliminated if authentication is implemented in SMM (a use of SMM driver 85) or in hardware (a crypto processor).

Where a processor has been described, it may include two or more constituent processors. Computer readable memories may be divided into multiple constituent memories, of the same or a different type. Steps in the flowcharts and other diagrams may be performed in a different order, steps may be eliminated or additional steps may be included, without departing from the invention.

The invention claimed is:

1. A device, comprising:
a processor; and
memory connected to the processor;
the memory comprising instructions that when executed by the processor cause the device to:
receive from a server, a signed server key, while the device is booted;
reboot a first time;
verify the signed server key during a DXE (driver execution environment) phase of firmware in the device during a boot process of the device;
send a nonce to the server while the device is booted, the nonce being encrypted using the signed server key;
receive, while the device is booted, a message from the server that includes a first portion with a secure command and a second portion that is based on a hash of the nonce;
reboot a second time;
verify the message during the DXE phase of the firmware during another boot process of the device; and
execute the secure command.

2. The device according to claim 1, wherein the second portion is the hash of the nonce.

3. The device according to claim 1, wherein the signed server key is sent by the server to other devices that are served by the server.

4. The device according to claim 3, wherein the device and the other devices have the same make and model.

5. The device according to claim 1, wherein the signed server key is signed by a further, signing server.

6. The device according to claim 1, wherein the second portion is a signature that is calculated as if the hash of the nonce were in the message.

7. The device according to claim 1, wherein the instructions, when executed by the processor, cause the device to save state data in secure storage in the device in response to verifying the message.

8. A method for securely sending a command to a device comprising the steps of:
receiving from a server, a signed server key, while the device is booted;
rebooting the device a first time;
verifying the signed server key during a DXE (driver execution environment) phase of firmware in the device during a boot process of the device;
sending a nonce to the server while the device is booted, the nonce being encrypted using the signed server key;
receiving, while the device is booted, a message from the server that includes a first portion with a secure command and a second portion that is based on a hash of the nonce;
rebooting the device a second time;
verifying the message during the DXE phase of the firmware during another boot process of the device; and
executing the secure command.

9. The method according to claim 8, wherein the signed server key and message are verified by a DXE driver.

10. The method according to claim 9, further comprising the DXE driver generating the nonce after the first reboot.

11. The method according to claim 8, wherein the second portion is the hash of the nonce.

12. The method according to claim 8, wherein the second portion is a signature that is calculated as if the hash of the nonce were in the message.

13. The method of claim 8, further comprising sending a further message between the server and the device, wherein the further message is encrypted with a session key derived from selected bits of the nonce.

14. The method of claim 8, wherein the message includes a key revocation list.

15. The method of claim 8, wherein the receiving steps and the sending step are carried out via an agent present in an operating system of the device.

* * * * *